June 2, 1964

G. L. MITTELSTEADT 3,135,434

POWDER MEASURE

Filed March 19, 1963

INVENTOR
GLEN L. MITTELSTEADT
BY
Williamson & Palmatier
ATTORNEYS

United States Patent Office 3,135,434
Patented June 2, 1964

3,135,434
POWDER MEASURE
Glen L. Mittelsteadt, Waseca, Minn., assignor to Herter's Inc., Waseca, Minn., a corporation of Minnesota
Filed Mar. 19, 1963, Ser. No. 266,418
5 Claims. (Cl. 222—306)

This invention relates to an apparatus for measuring by volume and dispensing quantities of gun powder in connection with the loading or reloading of cartridges or shells.

In connection with measuring of gun powder for loading cartridges, it is extremely important that the quantity of powder measured and dispensed be accurate to an extremely high degree and furthermore, that in successive measuring and dispensing operations, like amounts, to a high degree of accuracy be measured and dispensed. Although such measuring and dispensing apparatus have been known heretofore, difficulties have been encountered in maintaining a predetermined measure of powder particularly in successive operations and it has also been difficult to change the setting of the measuring apparatus and subsequently come back to the identical setting without a considerable waste of time in measuring samples by weight.

An object of the invention is to provide a new and improved powder measure of simple and inexpensive construction and operation.

Another object of the invention is to provide a novel apparatus for accurately measuring, by volume, predetermined quantities of powder with a minimum of effort and adjustment in relation to arriving at the setting of the apparatus relating to the desired predetermined quantity.

A further object of the invention is to provide in a cam controlled variable measuring device for gun powder and the like, improved and novel mechanism which, through extremely simple adjustment is adapted for measuring over an extremely wide range of quantities, accurate amounts of gun powder.

These and other objects and advantages of the invention will more fully appear from the following description made in connection with the accompanying drawings wherein like reference characters refer to similar parts throughout the several views and in which.

Figure 1:
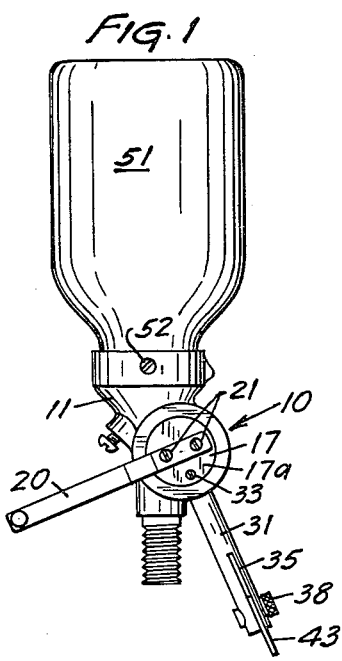
FIG. 1 is an elevation view of the powder measure.

One form of the present invention is shown in the drawings and is described herein.

The powder measure is indicated in general by numeral 10 and includes a rigid metal housing 11 having an upper portion 11a forming an open topped hopper 12 for funneling gun powder downwardly along the downwardly converging hopper walls 13 toward the supply opening 14 which communicates between the bottom of the hopper 12 and the upper portion of a cylindrical rotor-mounting chamber 15 at the intermediate portion 11b of the housing. The cylindrical chamber 15 has its central axis horizontally oriented so as to rotatably or swingably mount a cylindrical rotor 17, the opposite ends 17a of which extend as seen in FIG. 1 to the exterior of the housing 11. The cylindrical peripheral surface 18 of the rotor is related to the inner peripheral wall surface 19 of the chamber 15 in closely fitting and relatively tight-fitting relation so as to prevent any quantities of powder from collecting between these peripheral walls, but also such as to permit turning of the rotor 17 in the chamber 15. A handle 20 is attached as by screws 21 to the rotor 17 to effect turning of the rotor.

The lower portion 11c of the housing defines a downwardly extending passage 22 therethrough and communicating with the chamber 15 at the discharge port 23 at the lower side of the chamber 15. The lower portion of housing 11c is threaded internally and externally at 24 and 25 to facilitate attachment of the powder measure 10 or a supporting appliance and to facilitate attachment of other devices as for guiding the measured quantities of powder being discharged.

The housing 11, at the intermediate portion 11b thereof is also provided with an arcuate slot 26 at one transverse side of the chamber 15 and communicating between the chamber 15 and the exterior of the housing. The slot 26 extends arcuately around the periphery of chamber 15 and rotor 17 with the opposite ends 27 and 28 of the slot being respectively disposed in spaced relation with the supply at discharge ports 14 and 23.

The rotor 17 has an opening 29 extending diametrically therethrough. One end portion 30 of the opening 29 communicates alternately with the supply port 14 and the discharge port 23 as the rotor 17 is swung to the full and dotted line positions illustrated in FIG. 2.

A rigid tube 31 has its inner end 32 affixed in the opening 29 of rotor 17 as by a set screw 33. The outer end 34 of the tube 31 extends outwardly through the slot 26, and is provided with an elongate slot 35 entirely across opposite sides of the tube so as to bifurcate the outer end 34 of the tube.

A pivot pin 36 extends transversely through the outer end 34 of the tube and through apertures 37 therein. The pivot pin 36 has a releasable retaining nut 38 thereon for tightening against the bifurcated end 34 of the tube and also for permitting complete removal of the pin 36 from the tube.

A piston 39 is slidably mounted in tight-fitting relation within the tube 31 so as to cooperate with the inner end 32 of the tube and with the opening 29 in the rotor in defining a measuring cell 40 of variable size. The outer end of the piston 39 is provided with an endwise facing cam-following surface 41 and is also provided with an endwise extending rigid lip 42 extending beyond the surface 41.

Means are provided for controlling the positioning of the piston 39, and such means includes a flat plate-like rigid cam 43 having a central mounting aperture rotatably mounted upon the circular periphery of the pivot pin 36 so as to facilitate swinging of cam 43. The cam 43 lies in the slot 35, and the bifurcated end portion 34 of the tube, may be clamped against the cam 43 by tightening nut 38 so as to retain the cam in any desired orientation.

The cam 43 has an outer camming edge 44 which progressively varies in spacing from the pivot pin 36. It will be noted that the outer camming surface 44 extends substantially around the entire periphery of the cam 43. It is to be particularly noted that the portion 45 of the cam edge 44, which is most remote from pivot 36 as compared to all other portions of the cam, is disposed next adjacent the portion 46 of the camming edge 44, which portion 46 is least remote of all portions of the edge from the pivot 36. An elongate coil-type tension spring 47 is provided for continuously urging the outer end of piston 39 against the camming edge 44. The upper end of the spring 47 is connected to the lip 42 which lies along one surface of the cam 43 to be guided thereby and prevent the piston 39 from rotating. It will be noted that the spring 47 is connected to the lip 42 at a location spaced from that portion of camming edge 44 which actually engages the shoulder surface 41 of the piston.

It is to be noted that the spring 47 extends downwardly within the tube 31 and along one side of the pivot 36 and lies in an annular groove 48 of the pin 36. The other end of spring 47 is looped around, but detachably connected to an anchor or pin 49 affixed on the cam 43. The anchor or pin 49 for the spring is positioned in spaced relation with the pivot 36 on a radius of the cam 43 between the pivot 36 and the portion 45 of camming edge 44 most remote from the pivot 36.

The upper portion 11a of the housing is attached to receive and support the neck 50 of a bottle 51 of gun powder. The bottle may be retained in position on the housing 11 as be set screw 52.

Figure 2:
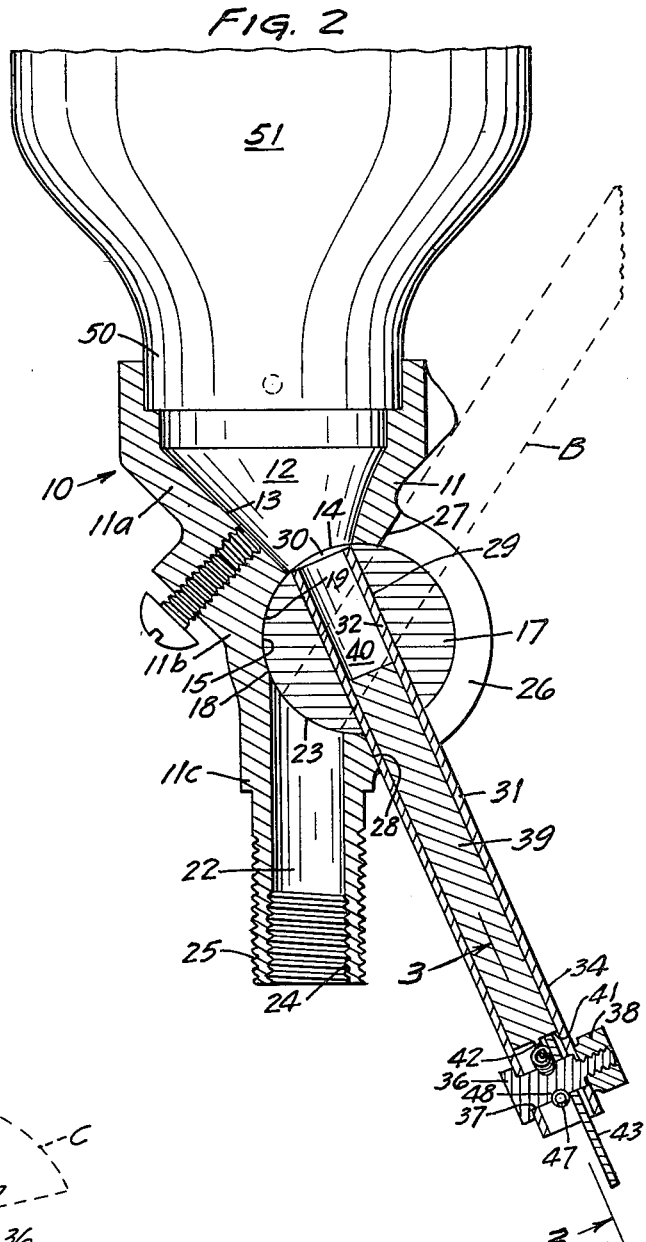
FIG. 2 is an enlarged longitudinal section view of the powder measure with certain portions thereof shown as indicated at 2—2 in FIG. 3.

In operation, assuming that the piston 39 has been placed in the proper position for adjusting the cell 40 to the desired volume measure, powder will flow downwardly into the cell 40 when the rotor 17 is in the position illustrated in FIG. 2. However, when the rotor 17 is swung until the tube 39 assumes the dotted line position B, the gun powder contained in the cell 40 is discharged through the port 23 and passage 22 from the dispensing unit.

In the adjusting of the piston 39, the nut 38 is first loosened and then the plate-like cam 43 is swung to the desired position until a predetermined indicia on the cam 43 lies in a predetermined relation with an edge of the slot 35 on the tube. Swinging of the cam 43 produces progressive linear movement of the piston 39 along the tube. The lip 42 guides against one surface of the cam 43 and prevents rotation of the piston and maintains the upper end of the spring 47 in an out-of-the-way position with respect to the interengagement of the edge 44 and surface 41 of the pistion and thereby provides unobstructed camming action to carefully control the movement of the piston.

Figure 3:
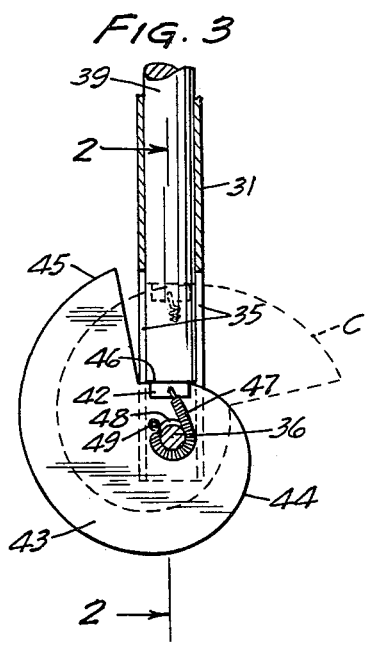
FIG. 3 is an enlarged detail section view taken approximately at 3—3 in FIG. 2.

Movement of the spring 47 during rotation of the cam 43 is important and is to be particularly noted. As viewed in FIG. 3, when the cam 43 is swung from the dotted line position C shown to the full line position shown, the lower portion of the spring 47 is moved downwardly and then looped or wrapped around the pivot 36 in the manner shown so as to bodily move the entire spring while maintaining substantially constant spring pressure on the piston 39 for retaining the surface 41 against the edge 44 of the cam. Stretching and contracting of the tension spring 47 is maintained at an absolute minimum in spite of the fact that piston 39 travels linearly along a distance of very substantial length in the tube 31.

Finally, when the desired setting of the piston, as indicated by the position of indicia on the cam 43 in relation to the tube 31, the nut 38 will be tightened so as to clamp the difurcated end 34 of the tube against opposite sides of the cam 43 and thereby positively retain the cam 43 in the desired position.

During the operation of this cam 43 over a substantial period of time, there is substantially no change in the pressure by which the spring retains the piston against the cam, due to the extremely small, if any, flexing of the spring in the normal operation. As a result, the piston 39 will always be in a predetermined location in the tube 31 when the cam 43 is set at a predetermined orientation. The cam 43 may be changed in its setting and returned to an original setting and the volume of cell 40 will be identical to that previously obtained at the same setting of cam 43. It is to be noted that regardless of the longitudinal position of piston 39, the pressure with which spring 47 engages the camming edge 44 remains constant.

It will further be noted that by removing nut 38, the pivot 36 may be bodily removed from the tube 31. The cam 43 may then be slipped downwardly out of the slots 35 and the piston may be bodily removed through the unobstructed outer end 34 of the tube so as to permit the replacing of the piston 39 with another piston of different length so as to materially change the capacity of the cell 40.

It will, of course, be seen that various changes may be made in the form, details, arrangement and proportions of the parts without departing from the scope of the invention which consists of the matter shown and described herein and set forth in the appended claims.

What is claimed is:
1. A powder measure,
comprising a housing defining a cylindrical rotor-mounting chamber having a horizontal axis and having upper and lower sides and a peripheral sidewall, the housing having supply and discharge ports respectively communicating with the upper and lower sides of said chamber, said housing also having an arcuate slot through the peripheral sidewall and extending circumferentially of the chamber into spaced relation with said supply and discharge ports,
a cylindrical rotor mounted concentrically in said chamber for turning about said axis, said rotor having an opening extending therethrough and transversely of the rotation axis, said opening having a first open end alternately communicating with said supply and discharge ports when the rotor is turned,
a measuring tube having an inner end affixed in the opening of said rotor and having an outer end extending outwardly through said slot, said outer end having an elongate slot extending longitudinally of the tube,
a piston slidably mounted within the tube in tight-fitting relation and cooperating with the tube and rotor opening in defining a powder measure cell of variable size,
pivot means defining a pivot axis and mounted on the outer end of the tube and extending transversely of the elongate slot,
a flat cam swingably mounted on said pivot means and lying in said slot in a plane extending longitudinally of the tube, said cam having a camming outer edge variably spaced from said pivot axis and engaging said piston to control the positioning of the piston,
a spring within the tube and having opposite ends, one end of said spring being connected to the piston to continuously urge the piston against said camming edges,
and movable means anchoring the other end of the spring and connected with said cam for moving in response to swinging of the cam and in the longitudinal direction of the spring to maintain substantially constant spring pressure on the piston along the entire travel thereof in the tube.

2. A powder measure,
comprising a housing defining a cylindrical rotor-mounting chamber having a horizontal axis and having upper and lower sides and a peripheral sidewall, the housing having supply and discharge ports respectively communicating with the upper and lower sides of said chamber, said housing also having an arcuate slot through the peripheral sidewall and extending circumferentially of the chamber into spaced relation with said supply and discharge ports,
a cylindrical rotor mounted concentrically in said chamber for turning about said axis, said rotor having an opening extending therethrough and transversely of the rotation axis, said opening having a first open end alternately communicating with said supply and discharge ports when the rotor is turned,
a measuring tube having an inner end affixed in the opening of said rotor and having an outer end extending outwardly through said slot, said outer end having an elongate slot extending longitudinally of the tube,
a piston slidably mounted within the tube in tight-fitting relation and cooperating with the tube and rotor opening in defining a powder measuring cell of variable sizes,
a pivot mounted on the outer end of the tube and extending transversely of the elongate slot and through the tube,
a flat cam swingably mounted on said pivot and lying in said slot in a plant extending longitudinally of the tube, said cam having a camming outer edge variably spaced from said pivot and engaging said piston to control the positioning of the piston within the tube and thereby controlling the side of said measuring cell, a spring lying along said cam within the tube and having opposite ends, one end of said spring being connected to the piston to continuously urge the piston against said camming edge, and an anchor secured to the cam and connected with the other end of said spring, said anchor drawing the spring around the pivot when the cam is swung and thereby bodily moving the spring as the spring urges the piston along the tube to thereby maintain substantially constant pressure on the piston along the entire travel thereof.

3. The invention set forth in claim 2 wherein said camming outer edge of the cam has portions disposed more remotely from the pivot than other portions thereof, the portions of said camming edge most remotely and least remotely spaced from the pivot being disposed adjacent each other on the periphery of said cam, the elongate slot in the tube extending across opposite sides of the tube to thereby bifurcate the outer end of the tube, said anchor being disposed in spaced relation with said pivot and substantially on a radius extending from said pivot toward said most remotely spaced portion of the camming edge, whereby to maintain substantially constant spring pressure on the piston during the entire movement thereof along the tube.

4. The invention set forth in claim 2 and wherein the interior of the outer end of said tube in open and unobstructed, means releasably retaining said pivot in the tube and permitting removal of the pivot, said anchor and the corresponding end of the spring having cooperatively releasable connecting means, whereby to permit the piston to be replaced with another of different length and thereby widely vary the capacity of said cell.

5. The invention set forth in claim 2 wherein said piston has a guiding lip projecting downwardly along one side of said flat cam adjacent the camming edge, said piston also having an endwise facing surface adjacent said lip and engaging the camming edge of said cam, said spring being attached to the piston at said lip in spaced relation with said camming edge whereby to prevent turning of the piston and providing free and unobstructed camming relationship between said endwise-facing surface of the piston.

References Cited in the file of this patent
UNITED STATES PATENTS
774,326    Kelly _____ Nov. 8, 1904

UNITED STATES PATENT OFFICE
CERTIFICATE OF CORRECTION

Patent No. 3,135,434                          June 2, 1964

Glen L. Mittelsteadt

It is hereby certified that error appears in the above numbered patent requiring correction and that the said Letters Patent should read as corrected below.

Column 4, line 25, for "measure" read -- measuring --; line 38, for "edges" read -- edge --; line 69, for "sizes" read -- size --; line 74, for "plant" read -- plane --; column 6, line 4, for "in" read -- is --; line 22, after "said" insert -- edge and said --.

Signed and sealed this 20th day of October 1964.

(SEAL)
Attest:

ERNEST W. SWIDER                                      EDWARD J. BRENNER
Attesting Officer                                           Commissioner of Patents